US009061689B2

(12) United States Patent
Fujimoto et al.

(10) Patent No.: US 9,061,689 B2
(45) Date of Patent: Jun. 23, 2015

(54) AIR SPRING

(75) Inventors: Kenji Fujimoto, Osaka (JP); Takehiro Nishimura, Kobe (JP); Keiichiro Kamura, Kobe (JP)

(73) Assignees: TOYO TIRE & RUBBER CO., LTD., Osaka-shi (JP); KAWASAKI HEAVY INDUSTRIES LTD., Kobe, Hyogo (JP)

( * ) Notice: Subject to any disclaimer, the term of this patent is extended or adjusted under 35 U.S.C. 154(b) by 71 days.

(21) Appl. No.: 13/978,634

(22) PCT Filed: Mar. 28, 2011

(86) PCT No.: PCT/JP2011/057613
§ 371 (c)(1),
(2), (4) Date: Aug. 13, 2013

(87) PCT Pub. No.: WO2012/093501
PCT Pub. Date: Jul. 12, 2012

(65) Prior Publication Data
US 2013/0313764 A1 Nov. 28, 2013

(30) Foreign Application Priority Data
Jan. 7, 2011 (JP) ................................. 2011-001950

(51) Int. Cl.
*F16F 9/05* (2006.01)
*B61F 5/10* (2006.01)
(Continued)

(52) U.S. Cl.
CPC ............. *B61F 5/10* (2013.01); *B60G 2206/424* (2013.01); *F16F 9/05* (2013.01); *B60G 2202/152* (2013.01); *B61F 5/02* (2013.01); *F16F 9/052* (2013.01); *B60G 11/27* (2013.01)

(58) Field of Classification Search
CPC ...... F16F 9/05; F16F 9/052; B60G 2202/152; B60G 2206/424
See application file for complete search history.

(56) References Cited

U.S. PATENT DOCUMENTS 3,069,149 A * 12/1962 Neff ................................. 267/33
5,921,532 A * 7/1999 Pierce et al. ............... 267/64.19
(Continued)

FOREIGN PATENT DOCUMENTS

CN 2654696 Y 11/2004
JP 09-089029 A 3/1997
(Continued)

OTHER PUBLICATIONS

International Search Report dated Jul. 5, 2011, issued in corresponding application No. PCT/JP2011/057613.
(Continued)

*Primary Examiner* — Thomas Irvin
(74) *Attorney, Agent, or Firm* — Westerman, Hattori, Daniels & Adrian, LLP

(57) ABSTRACT

An air spring according to this invention enables easy and reliable adjustment of a space between stoppers. Specifically, an upper member (3) and a lower member (4) are secured to upper and lower ends of a bellows (2). Stopper faces (5) and (6) that come in contact with each other to limit the amount of displacement of the upper member (3) are formed on the upper member (3) and the lower member (4). A movable body (7) that can move vertically to adjust the height of the stopper face (6) is provided in the lower member (4). A holding body (8) is provided that holds the movable body (7) in a manner that enables vertical movement thereof. The movable body (7) is capable of relative rotation around a central axis (18) with respect to the holding body (8). On at least one of the movable body (7) and the holding body (8), tapers (32) and (41) are formed that are capable of sliding with respect to the other of the movable body (7) and the holding body (8). The movable body (7) is rotated relative to the holding body (8) to cause the tapers (32) and (41) to slide and thereby move the movable body (7) upward or downward.

4 Claims, 7 Drawing Sheets

(51) Int. Cl.
 *B61F 5/02* (2006.01)
 *B60G 11/27* (2006.01)

(56) References Cited

U.S. PATENT DOCUMENTS

| | | | | |
|---|---|---|---|---|
| 6,257,561 | B1 * | 7/2001 | Nakayama et al. | 267/64.19 |
| 6,820,883 | B2 * | 11/2004 | Lang et al. | 280/124.157 |
| 7,150,451 | B2 * | 12/2006 | Soles et al. | 267/64.27 |
| 7,284,644 | B2 * | 10/2007 | Cmich et al. | 188/321.11 |
| 7,500,659 | B2 * | 3/2009 | Levy | 267/64.27 |
| 8,272,653 | B2 * | 9/2012 | Falkner et al. | 280/124.145 |
| 8,317,172 | B2 * | 11/2012 | Quinn et al. | 267/220 |
| 2010/0327548 | A1 * | 12/2010 | Falkner et al. | 280/124.1 |
| 2013/0193664 | A1 * | 8/2013 | Egolf et al. | 280/124.157 |
| 2014/0117597 | A1 * | 5/2014 | Fujimoto, Kenji | 267/35 |

FOREIGN PATENT DOCUMENTS

| | | |
|---|---|---|
| JP | 2000-035075 A | 2/2000 |
| JP | 2000-88030 A | 3/2000 |
| JP | 2010-76608 A | 4/2010 |

OTHER PUBLICATIONS

Chinese Office Action dated Aug. 29, 2014, issued in corresponding CN application No. 201180061510.4 with English translation (11 pages).

* cited by examiner

AIR SPRING

TECHNICAL FIELD

The present invention relates to an air spring that, for example, is used for a railway vehicle and includes a stopper for limiting a displacement amount in a vertical direction.

BACKGROUND ART

In general, air springs that are interposed between a wheel side and a vehicle body side are mounted in a railway vehicle or the like to suppress vibrations (see FIG. 7). Upper and lower stoppers 101 and 102 for limiting a displacement amount in the vertical direction are provided in the air spring. For example, the upper and lower stoppers 101 and 102 are arranged so as to suppress the range of swaying that is produced by rolling of the vehicle body and prevent the vehicle body from contacting equipment in the surrounding area. The height of the air spring can be adjusted by supplying or discharging air to or from the air spring. For example, when wheels of a railway vehicle are worn out, the air spring is also used as an apparatus for adjusting the height of the vehicle body that has decreased to return the vehicle body height to the original level thereof.

However, when adjusting the vehicle body height, if the height of the air spring is merely raised, a space between the upper and lower stoppers 101 and 102 of the air spring widens and the range of swaying that is produced by rolling of the vehicle body increases, and there is thus a risk of the vehicle body contacting equipment in the surrounding area.

With regard to this problem, for example, Patent Literature 1 discloses an air spring that, by making a space between upper and lower stoppers adjustable, is configured to be capable of preventing a widening of the space between the upper and lower stoppers while adjusting the height of the air spring (see FIG. 8).

In the air spring disclosed in Patent Literature 1, an upper stopper member 103 and a lower stopper member 104 are provided on an upper face plate and a lower face plate, respectively. The upper stopper member 103 is configured to be rotatable. Flat faces 105 and 106 and protruding faces 107 and 108 are provided on the two stopper members 103 and 104. In this air spring, irrespective of whether the height of the vehicle is high or low, the space between the upper and lower stopper members 103 and 104 can be set to a predetermined range by rotating the upper stopper member 103 and selecting whether to cause the protruding faces 107 and 108 to face each other or to cause the flat faces 105 and 106 and the protruding faces 107 and 108 to face each other.

CITATION LIST

Patent Literature

Patent Literature 1: Japanese Patent Laid-Open No. 9-89029 (Paragraphs 0009, 0014, 0015, 0017, FIG. 1)

SUMMARY OF INVENTION

Technical Problem

In the air spring disclosed in Patent Literature 1, the space between the stoppers is adjusted by rotating the upper stopper member that is provided on the upper face plate. However, when adjusting the space between the stoppers, it is necessary to extract the bogie from the vehicle body and dismount the vehicle body from over the air spring.

In addition, the air spring disclosed in Patent Literature 1 has a structure such that an operator selects whether to cause the protruding faces of the upper and lower stopper members to contact against each other or to cause the flat faces and the protruding faces to contact against each other, and in a case where a displacement occurs in the horizontal direction of the air spring, there is a risk that the protruding faces will not contact against each other as intended or the flat faces and protruding faces will not contact against each other as intended. In such case, the stoppers no longer function normally and there is also a risk that the upper and lower protruding faces will only contact against each other in a narrow area at the edges thereof and will cause damage to the stopper members.

An object of the present invention is to provide an air spring that can easily and reliably adjust a space between stoppers, and can prevent damage to the stoppers.

SOLUTION TO PROBLEM

To achieve the aforementioned object, an air spring according to the present invention is an air spring in which an upper member and a lower member are secured to upper and lower ends of a bellows, respectively, and stopper faces that contact against each other and limit a displacement amount of the upper member are formed on the upper member and the lower member, the lower member including: a movable body that can move vertically to adjust a height of the stopper face of the lower member, and a holding body that holds the movable body in a manner that enables vertical movement thereof, wherein: the movable body is configured to be capable of relative rotation around a central axis with respect to the holding body; and on at least one of the movable body and the holding body, a taper that is slidable with respect to the other of the movable body and the holding body is formed that inclines in a circumferential direction of the movable body relative to a horizontal surface.

According to the above described configuration, since a taper that inclines in a circumferential direction relative to a horizontal surface is formed in the movable body and/or the holding body, the movable body can be caused to move vertically by merely rotating the movable body relative to the holding body to cause the taper of the movable body and/or the holding body to slide with respect to the other of the movable body and the holding body. Further, since the movable body and the holding body are provided on the lower member, without dismounting the vehicle body from over the air spring, the movable body can be caused to move vertically to adjust the height of the stopper face of the lower member, and a space between the stoppers can be easily and reliably adjusted.

Although a shape of each stopper face is not particularly limited, it is favorable to adopt a configuration in which the stopper face of at least one of the upper member and the lower member is formed in a flat shape.

According to this configuration, since the two stopper faces are not formed in a convexo-concave shape and at least one of the stopper faces is formed in a flat shape, even if a displacement occurs to some extent in the horizontal direction in the air spring, the stoppers can be caused to function normally, and easy and reliable adjustment of the stopper space can be ensured. That is, with regard to the stopper face that has a flat shape, since a situation does not arise in which a space between the stopper face and the other stopper changes at each area thereof, even if a displacement to some extent in the horizontal direction also occurs when the air spring changes position in the vertical direction, the two stopper faces can be caused to contact against each other with a vertical displacement amount that is in accordance with a set amount.

In addition, because at least one of the stopper faces is formed in a flat shape, a situation does not arise where the upper and lower stopper faces contact each other only at narrow areas at the ends of the convex portions thereof, which is a situation that arises when the two stopper faces are formed in a convexo-concave shape. Hence, the two stopper faces can be caused to securely contact against each other over a wide area and thus prevent the occurrence of damage to the stopper faces.

It is also possible to adopt a configuration in which a plurality of the tapers are formed, and a horizontal surface that positions the movable body in a height direction is provided between the respective tapers.

According to this configuration, the movable body can be positioned by causing one of the movable body and the holding body to ride up onto a horizontal surface of the other of the movable body and the holding body and a force in a vertical direction that acts between the movable body and the holding body can be efficiently received by the horizontal surface, and a force that causes the movable body to rotate with respect to the holding body can be prevented from arising by the action of the tapers. Note that a configuration may also be adopted in which only a single taper is formed without providing a horizontal surface and, for example, a stopper face is positioned at a desired height by restricting rotation of the movable body with respect to the holding body to thereby prevent vertical movement of the movable body.

Further, a configuration can also be adopted in which a handle is provided that causes one of the movable body and the holding body to rotate, and a fixing portion is provided that fixes the handle to the other of the movable body and the holding body.

According to this configuration, since a handle is provided that causes one of the movable body and the holding body to rotate, the movable body can be easily caused to rotate relative to the holding body, and furthermore, since the handle can be fixed to the other of the movable body and the holding body by the fixing portion, rotation of the movable body with respect to the holding body can be prevented and the movable body can be reliably positioned.

In addition, the present invention provides a stopper for an air spring that is provided on a lower member of an air spring and that contacts against an upper member of the air spring to limit a displacement amount of the upper member, the stopper for an air spring including: a movable body that can move vertically to adjust a height of a stopper face of the lower member, and a holding body that holds the movable body in a manner that enables vertical movement thereof, in which: the movable body is configured to be capable of relative rotation around a central axis with respect to the holding body; and on at least one of the movable body and the holding body, a taper that is slidable with respect to the other of the movable body and the holding body is formed that inclines in a circumferential direction of the movable body relative to a horizontal surface.

In the stopper for an air spring that is configured in this manner, the configuration of principal portions is the same as in the above described air spring, and accordingly similar effects as those of the above described air spring are obtained by the stopper for an air spring.

ADVANTAGEOUS EFFECTS OF INVENTION

As described above, according to the present invention, since a movable body and a holding body are provided on a lower member of an air spring, and a taper is formed on at least one of the movable body and the holding body, the movable body can be caused to rotate with respect to the holding body and thereby caused to move vertically, and thus the height of a stopper face can be easily adjusted without dismounting the vehicle body from over the air spring.

As a result, for example, when the wheels of a railway vehicle are worn, the range of swaying that is produced by rolling of the vehicle body can be suppressed by adjusting the space between the upper and lower stopper faces while adjusting the vehicle body height by supplying or discharging air to or from the air spring. Further, by forming a stopper face of at least one of the upper member and the lower member in a flat shape, even if a horizontal displacement of the air spring occurs, the space between the upper and lower stopper faces can be reliably adjusted and damage of the stoppers can be prevented.

DESCRIPTION OF EMBODIMENT

A form for implementing an air spring according to the present invention is described hereunder using the attached drawings.

Figure 1:
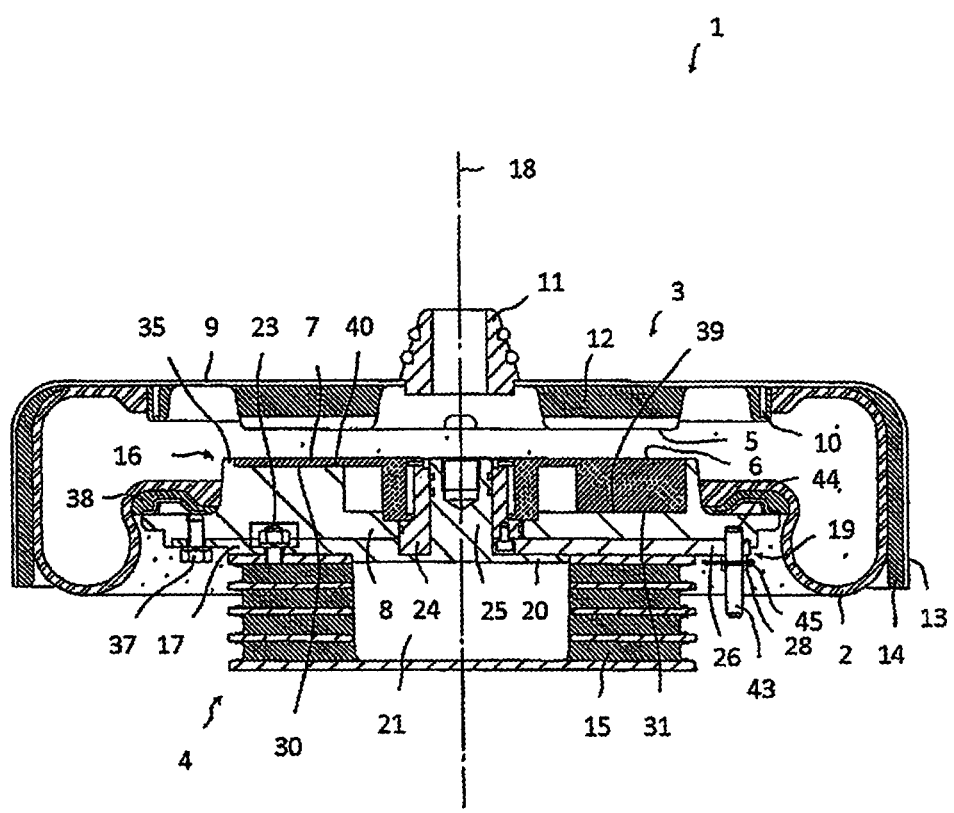
FIG. 1 is a sectional view of an air spring according to the present invention.
Figure 2:
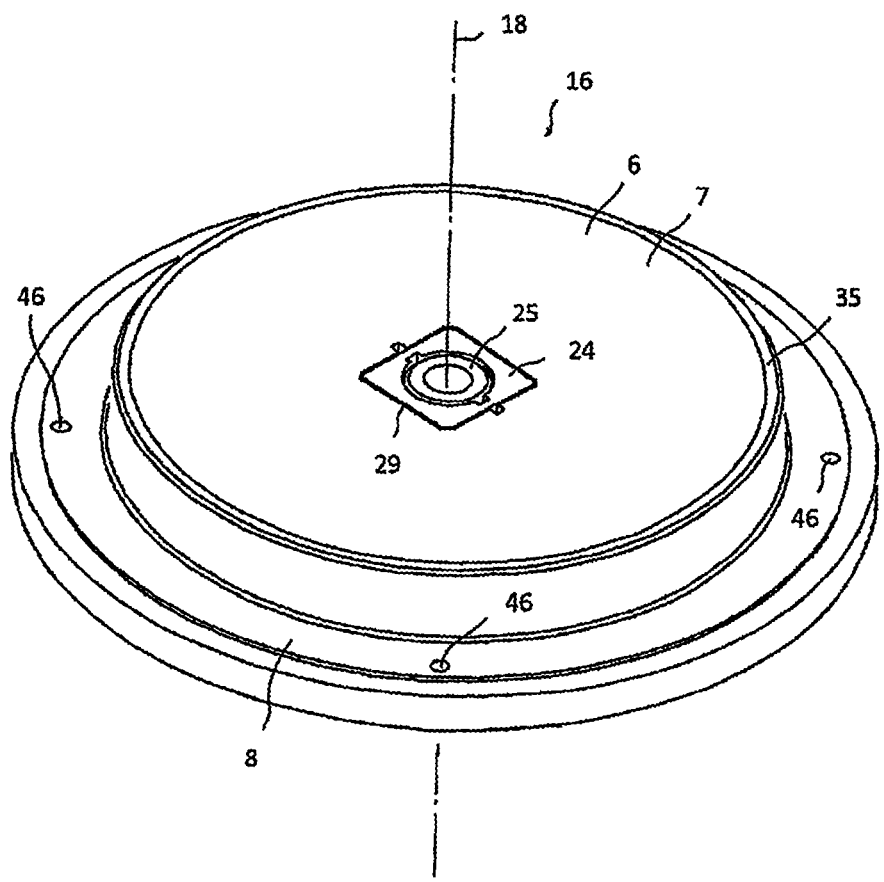
FIG. 2 is a perspective view of a lower stopper as seen from an upper side.
Figure 3:
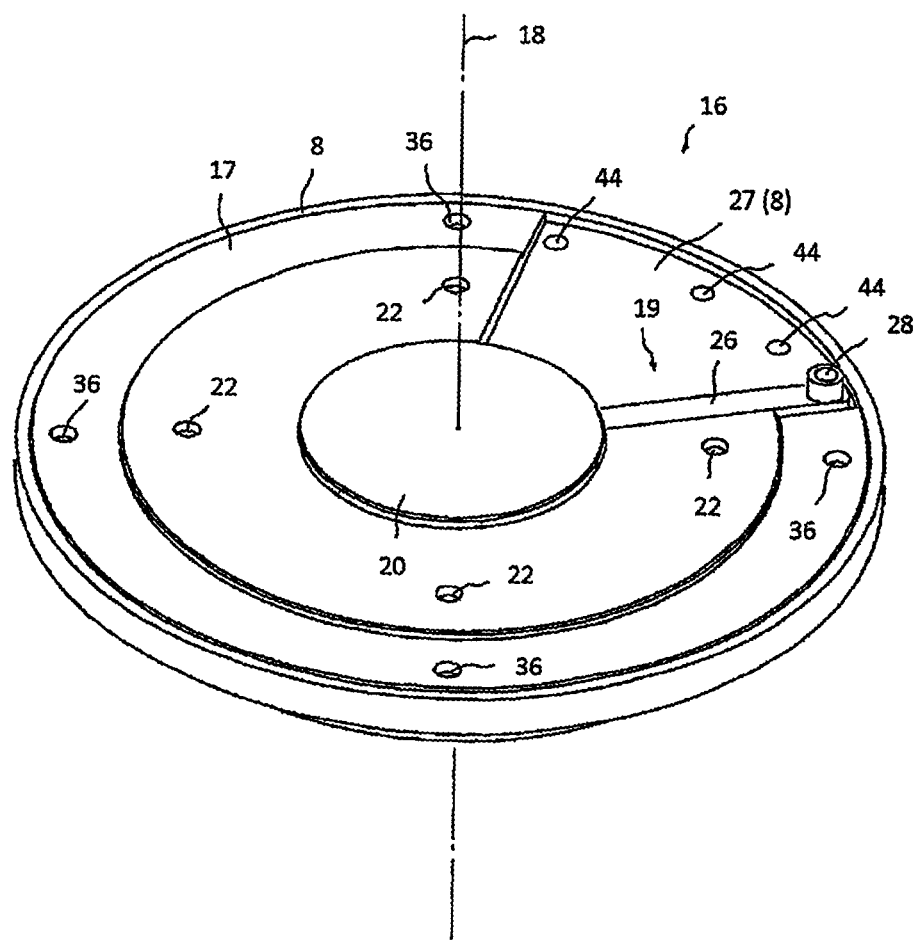
FIG. 3 is a perspective view of the lower stopper as seen from a lower side.
Figure 4:
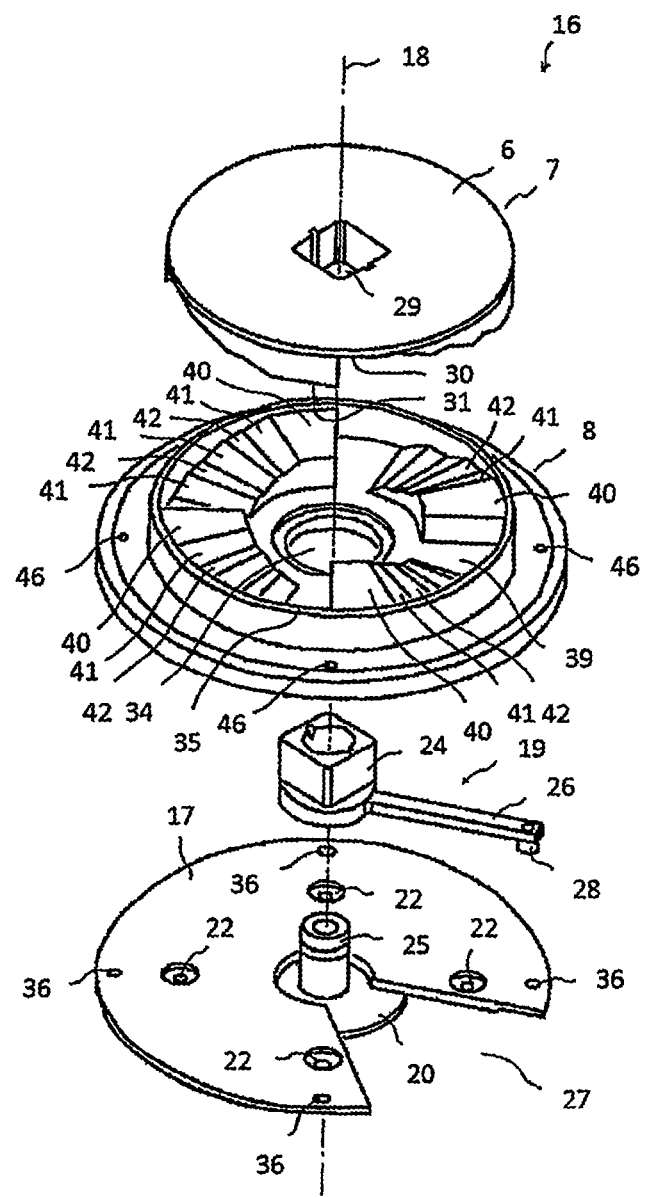
FIG. 4 is an exploded perspective view of the lower stopper as seen from the upper side.
Figure 5:
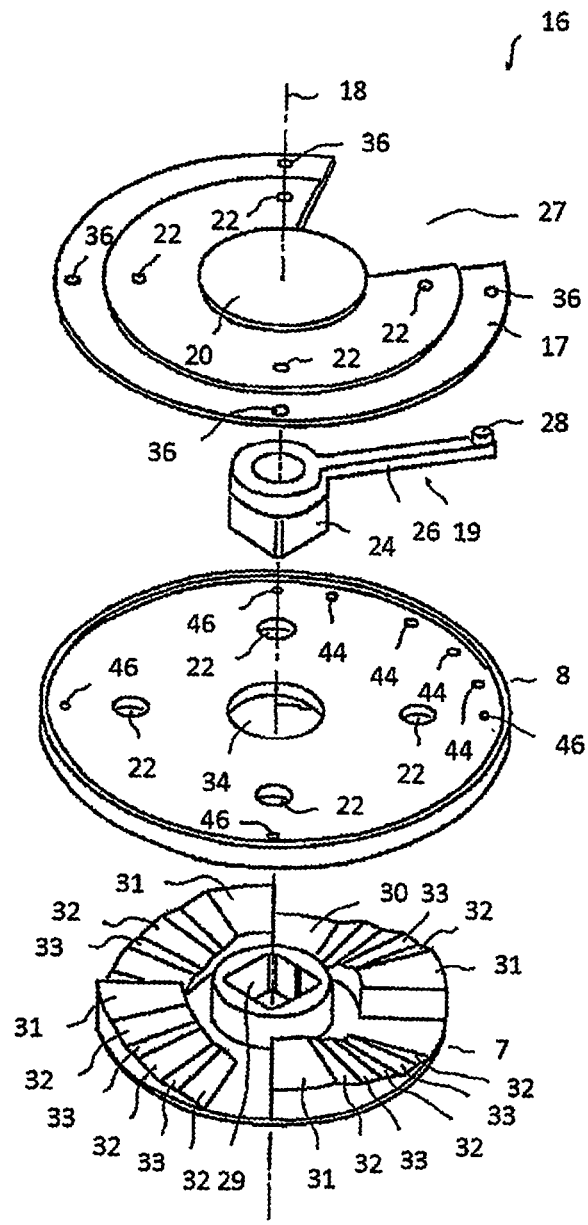
FIG. 5 is an exploded perspective view of the lower stopper as seen from the lower side.

As shown in FIG. 1, an air spring 1, for example, is interposed between a vehicle body side and a wheel side of a railway vehicle to suppress vibrations of the railway vehicle, and furthermore, when the wheels are worn, the air spring 1 is used to adjust the vehicle body height to the regular height thereof by supplying or discharging air to or from the air spring 1. The air spring 1 has a structure in which an upper member 3 that is attachable to the vehicle body side is secured to an upper end of a bellows 2 that is made from a tubular rubber membrane, a lower member 4 that is attachable to the wheel side is secured to a lower end of the bellows 2, and stopper faces 5 and 6 that contact against each other to limit a displacement amount in the vertical direction of the upper member 3 are formed on the upper member 3 and the lower member 4. The air spring 1 also includes, on the lower member 4 thereof, a movable body 7 that can move vertically to adjust the height of a stopper face 6 of the lower member 4, and a holding body 8 that holds the movable body 7 in a manner that enables vertical movement thereof.

The upper member 3 is provided with a circular upper face plate 9 that is made of steel, for example, and a rubber seat 10 that protrudes in a ring shape from a lower face thereof, and has a structure in which, at a central part of the upper face plate 9, a connecting portion 11 is provided that protrudes to the upper side and is connected to a pressurized air supply portion (unshown). In the rubber seat 10, for example, a ring-shaped metal piece is covered with rubber. By fitting the rubber seat 10 inside the upper end of the bellows 2, the upper member 3 is secured to the upper end of the bellows 2 and a space between the rubber seat 10 and the bellows 2 is sealed, and air can be supplied to or discharged from the bellows 2 through the connecting portion 11.

On the lower face of the upper face plate 9, at an area further on the inside than the rubber seat 10 that is at the circumference of the connecting portion 11, an upper stopper 12 is provided that is made of rubber. The lower face of the upper stopper 12 is taken as a stopper face 5. The stopper face 5 is formed in a convexo-concave shape in which a plurality of grooves that are parallel to a radial direction are formed. The grooves serve as a path for air that flows to the bellows 2 from the connecting portion 11 when supplying air into the air spring 1 from which air had escaped and in which the two stopper faces 5 and 6 are contacting against each other.

A cylindrical portion 13 that protrudes downwards is formed at a peripheral edge portion of the upper face plate 9. The cylindrical portion 13 is folded back so as to press the lower end thereof upward and inward, and regulates expansion of the bellows 2 to which air was supplied. The inner surface of the cylindrical portion 13 is covered with a rubber 14, and is configured so as to reduce abrasion of the bellows 2 when the upper member 3 changes position in the horizontal direction.

The lower member 4 has a structure in which a lower stopper 16 that contacts against the upper stopper 12 to limit a displacement amount of the upper member 3 is attached to a spring seat 17, and the spring seat 17 is secured to an upper face side of a laminated rubber 15.

As shown in FIG. 1 to FIG. 5, the lower stopper 16 includes the holding body 8 that is secured to the spring seat 17, the movable body 7 that the holding body 8 holds, and a handle 19 that rotates the movable body 7 around a central axis 18.

The spring seat 17, for example, is made of steel and formed in a disk shape, a circular anti-slip device 20 formed on a lower face thereof is engaged in a center hole 21 of the laminated rubber 15, and the spring seat 17 is fixed by bolts to the laminated rubber 15 by inserting bolts 23 into bolt holes 22. A support shaft 25 that protrudes from the center to the upper side and supports a boss portion 24 of the handle 19 is formed in the spring seat 17. Further, a notch 27 for positioning an arm 26 of the handle 19 is formed, for example, in a fan shape in which a central angle is approximately 60° in the spring seat 17.

The handle 19 is formed by providing the boss portion 24 that engages with the movable body 7 at a proximal end portion of the arm 26, and a distal end portion thereof is operated to rotationally move the movable body 7 around the central axis 18. In addition, a pin hole 28 as a fixing portion provided at the distal end portion is fixed to the holding body 8 to prevent rotation of the movable body 7.

The movable body 7 is, for example, a disk shape and is made from a metal such as aluminum or a synthetic resin. A fitting hole 29 in which the boss portion 20 of the handle 19 is fitted is formed in a central part of the movable body 7. The upper face of the movable body 7 is taken as the stopper face 6 that has a flat shape. On the lower face side of the movable body 7, horizontal surfaces 31 that protrude to the lower side from a lower face 30 of the movable body 7 are formed at a plurality of places, and a plurality of tapers 32 that incline in the circumferential direction of the movable body 7 relative to the horizontal surfaces, and intermediate horizontal surfaces 33 are alternatively formed so as to connect the lower face 30 of the movable body 7 and each horizontal surface 31.

The holding body 8 is, for example, formed in a disk shape and is made from a metal such as aluminum or a synthetic resin. A through hole 34 through which the support shaft 25 of the spring seat 17 and the boss portion 24 of the handle 19 are inserted is formed in a central part of the holding body 8. A cylindrical portion 35 is formed on an upper face side of the holding body 8. The cylindrical portion 35 holds the movable body 7 in a condition that allows the movable body 7 to move vertically and to also rotate around the central axis 18.

The boss portion 24 of the handle 19 that is fitted onto the exterior of the support shaft 25 is interposed between the holding body 8 and the spring seat 17, and the holding body 8 is fixed by bolts to the spring seat 17 by means of bolts 37 that are inserted through bolt holes 36 and screwed into screw holes 46. A rubber seat 38 is provided at a position that is further on an outer circumferential side than the cylindrical portion 35 of the holding body 8, and the holding body 8 also functions as a bead seat that secures and seals the lower end of the bellows 2.

At positions on the upper face side of the holding body 8 that are on the inner side of the cylindrical portion 35, horizontal surfaces 40 that protrude from an upper face 39 of the holding body 8 to the upper side are formed at a plurality of places, and a plurality of tapers 41 that incline in the circumferential direction of the movable body 7 relative to the horizontal surfaces, and intermediate horizontal surfaces 42 are alternatively formed so as to connect the upper face 39 of the holding body 8 and each horizontal surface 40.

The movable body 7 is inserted into the cylindrical portion 35 of the holding body 8, and the lower face 30, the horizontal surfaces 31, the tapers 32, and the intermediate horizontal surfaces 33 of the movable body 7, and the horizontal surfaces 40, the upper face 39, the tapers 41, and the intermediate horizontal surfaces 42 of the holding body 8 mesh together. The tapers 32 of the movable body 7 and the tapers 41 of the holding body 8 are capable of sliding with respect to each other, and the configuration is such that the movable body 7 is moved in the vertical direction by operating the handle 19 to rotate the movable body 7 around the central axis 18.

The movable body 7 is positioned in the height direction in a plurality of states in which the lower face 30, the horizontal surfaces 31, and the intermediate horizontal surfaces 33 of the movable body 7 have ridden up onto the horizontal surfaces 40, the upper face 39, and the intermediate horizontal surfaces 42 of the holding body 8.

A plurality of pin insertion holes 44 into which a pin 43 that is inserted through the pin hole 28 of the handle 19 is inserted are formed in the lower face of the holding body 8, and a configuration is adopted such that the handle 19 is fixed with respect to the holding body 8 in a state in which the movable body 7 has been positioned in the height direction. The pin 43 that has been inserted through the pin hole 28 is prevented from dropping out of the pin hole 28 by a split pin 45.

Figure 6:
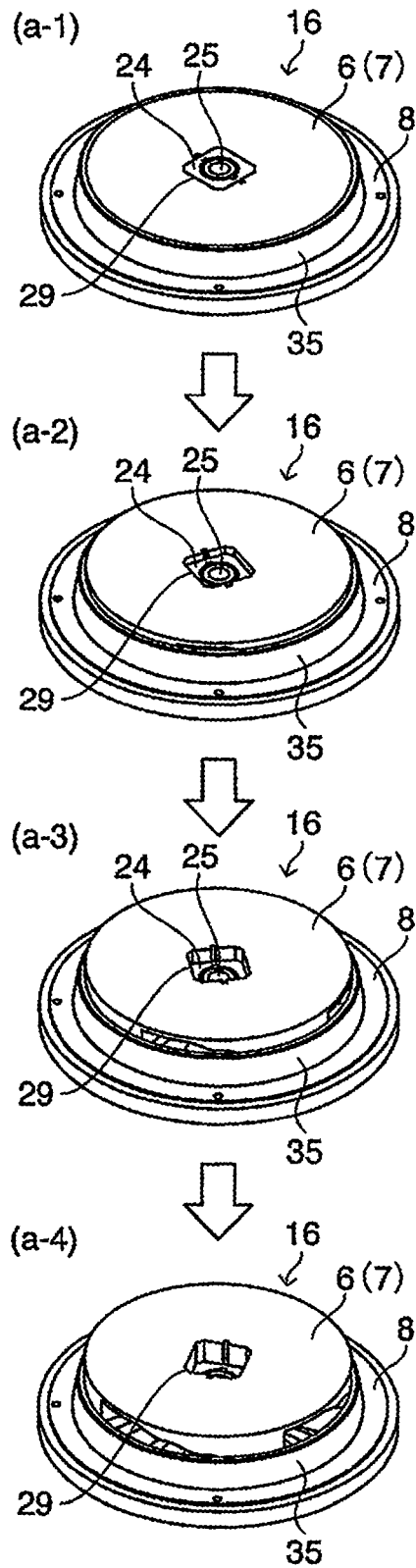
FIG. 6 includes views that illustrate operations of the lower stopper, in which (a-1) to (a-4) are views as seen from the upper side and (b-1) to (b-4) are views as seen from the lower side.
Figure 6:
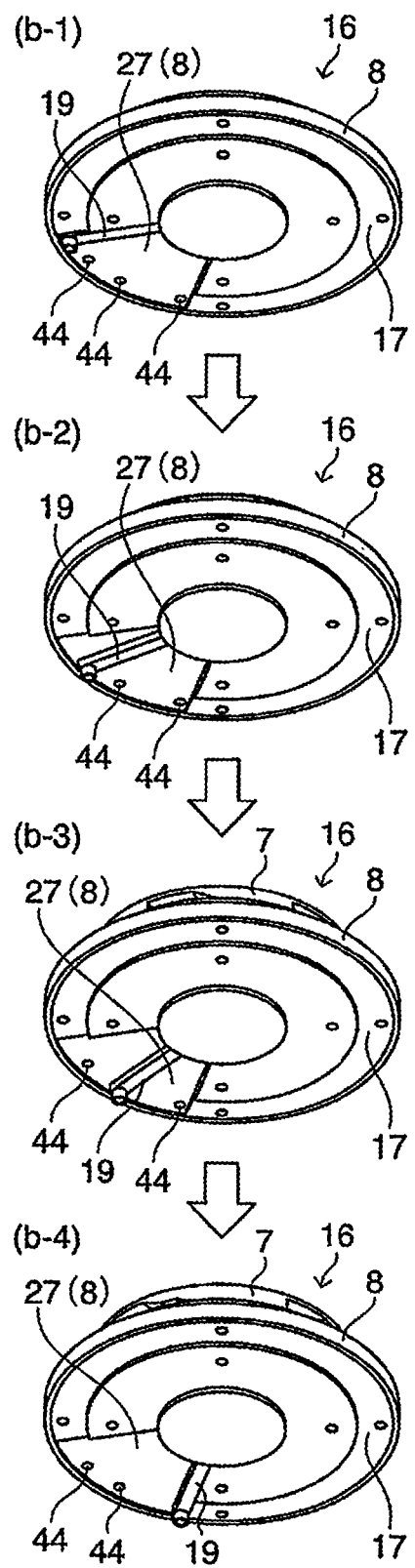
Figure 7:
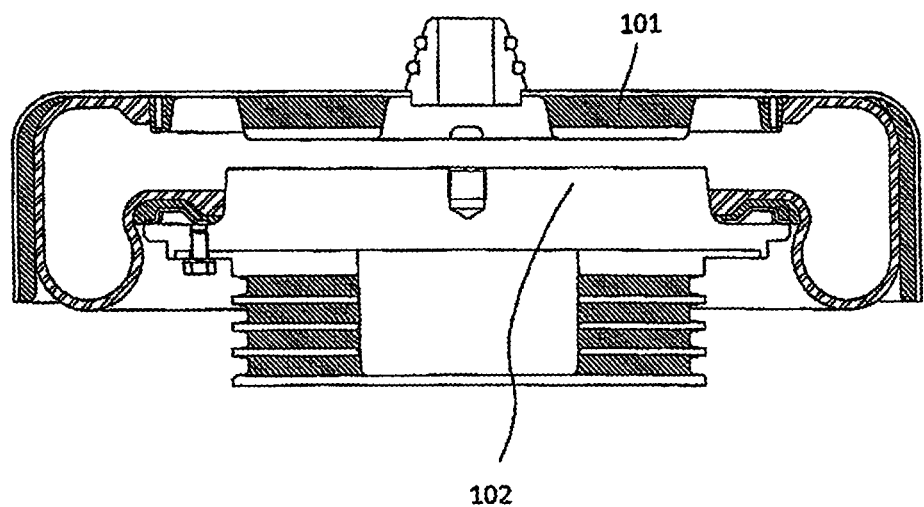
FIG. 7 is a sectional view of a conventional air spring.
Figure 8:
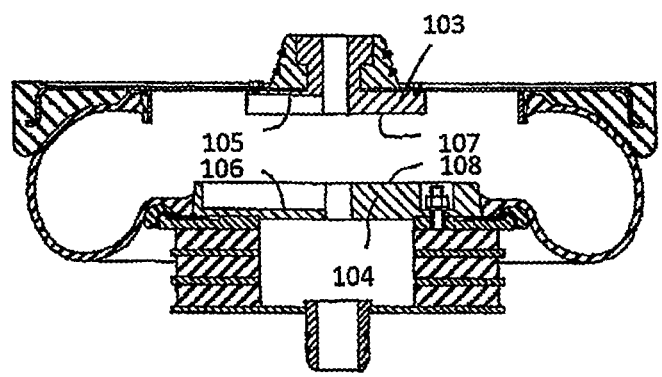
FIG. 8 is a sectional view of an air spring equipped with a conventional stopper whose height is adjustable.

Next, operations of the lower stopper are described. As shown in FIG. 6, the handle 19 that is exposed from the notch 27 is operated from the lower side of the spring seat 17 to rotate the boss portion 24 of the handle 19 around the support shaft 25 of the spring seat 17. As a result, the movable body 7 that is engaged with the boss portion 24 at the fitting hole 29 rotates around the central axis 18, the tapers 32 of the movable body 7 and the tapers 41 of the holding body 8 slide with respect to each other, the movable body 7 moves in the vertical direction while rotating, and the height of the stopper face 6 on the lower side changes.

The movable body 7 moves between a state in which the lower face 30 thereof is mounted on the upper face 39 of the holding body 8 (a-1, b-1) and a state in which the lower face 30 thereof is mounted on the horizontal surfaces 40 of the holding body 8 (a-4, b-4), and between those states the movable body 7 is temporarily positioned in states in which the lower face 30 is mounted on the intermediate horizontal surfaces 42 of the holding body 8 (a-2, b-2) and (a-3, b-3).

In a state in which the movable body 7 has been positioned in the height direction and the stopper face 6 on the lower side has been adjusted to a desired height, the position of the pin hole 28 of the handle 19 corresponds to a position of one pin insertion hole 44 in the lower face of the holding body 8. The height adjustment of the stopper face 6 on the lower side is completed by inserting the pin 43 into the pin hole 28 and the pin insertion hole 44 and preventing the pin 43 from falling out using the split pin 45, to thereby restrict vertical movement of the movable body 7.

According to the above described configuration, since the height of the stopper face 6 can be adjusted by operating the handle 19 from the lower side of the spring seat 17, the stopper space can be easily adjusted without dismounting the vehicle body from over the air spring 1.

Further, since the stopper face 6 on the lower side is formed in a flat shape, even if the air spring 1 changes position in the horizontal direction and a deviation arises with respect to a center position between the upper member 3 and the lower member 4, the space between the two stopper faces 5 and 6 does not change and the stopper space can be maintained at the set space. Further, since the stopper face 6 on the lower side is a flat shape, the stopper faces 5 and 6 do not come in contact at a narrow area of protruding portions, and thus damage to the stopper faces 5 and 6 can be prevented.

Note that the present invention is not limited to the above described embodiment, and can be suitably changed within the scope of the present invention. For example, the air spring 1 is not limited to an air spring for a railway vehicle and may be an air spring that is used for another purpose. Further, the holding body 8 and the spring seat 17 may also be formed in an integrated manner, and need not be formed as separate elements.

It is sufficient that the movable body 7 is capable of relative rotation around the central axis 18 with respect to the holding body 8, and a configuration may also be adopted in which the holding body 8 is rotated instead of the movable body 7. In addition, it is sufficient to form the tapers 32 and 41 on at least one of the movable body 7 and the holding body 8, and a configuration may also be adopted in which only one of the tapers 32 and 41 is formed.

It is sufficient to form at least one of the stopper faces 5 and 6 in a flat shape, and it is sufficient to form only the stopper face 5 on the upper side in a flat shape instead of forming the stopper face 6 on the lower side in a flat shape, and a configuration may also be adopted in which both of the stopper faces 5 and 6 are formed in a flat shape.

Instead of forming a plurality of the tapers 32 and 41 and providing the intermediate horizontal surfaces 33 and 42 that position the movable body 7 in the height direction, it is also possible to form only a single taper and position the movable body 7 in a stepless manner. In this case, although some of the force acting in the vertical direction is converted to a force that acts in the circumferential direction by the taper, movement of the movable body 7 in the vertical direction can be prevented by, for example, fixing the handle 19 to the holding body 8 to prevent rotation of the movable body 7.

Industrial Applicability

An air spring according to the present invention can be favorably adopted, for example, for use as an air spring that is interposed between a wheel side and a vehicle body side of a railway vehicle to limit a displacement amount in a vertical direction of a stopper thereof while suppressing vibrations of the railway vehicle.

Reference Signs List

1 Air spring
2 Bellows
3 Upper member
4 Lower member
5 Stopper face
6 Stopper face
7 Movable body
8 Holding body
9 Upper face plate
10 Rubber seat
11 Connecting portion
12 Upper stopper
13 Cylindrical portion
14 Rubber
15 Laminated rubber
16 Lower stopper
17 Spring seat
18 Central axis
19 Handle
20 Anti-slip device
21 Center hole
22 Bolt hole
23 Bolt
24 Boss portion
25 Support shaft
26 Arm
27 Notch
28 Pin hole
29 Fitting hole
30 Lower face
31 Horizontal surface
32 Taper
33 Intermediate horizontal surface
34 Through hole
35 Cylindrical portion
36 Bolt hole
37 Bolt
38 Rubber seat
39 Upper face
40 Horizontal surface
41 Taper
42 Intermediate horizontal surface
43 Pin
44 Pin insertion hole
45 Split pin
46 Screw-hole

The invention claimed is:

1. An air spring in which an upper member and a lower member are secured to upper and lower ends of a bellows, respectively, and stopper faces that contact against each other and limit a displacement amount of the upper member are formed on the upper member and the lower member, the lower member comprising:
 a movable body that can move vertically to adjust a height of the stopper face of the lower member; and
 a holding body that holds the movable body in a manner that enables vertical movement thereof, wherein the movable body is configured to be capable of relative rotation around a central axis with respect to the holding body, wherein on at least one of the movable body and the holding body, a plurality of tapers slidable with respect to the other of the movable body and the holding body are formed that inclines in a circumferential direction of the movable body relative to a horizontal surface, and wherein a horizontal surface that positions the movable body in a height direction is provided between respective tapers.

2. The air spring according to claim 1, wherein the stopper face of at least one of the upper member and the lower member is formed in a flat shape.

3. The air spring according to claim 1, wherein a handle is provided that causes one of the movable body and the holding body to rotate, and a fixing portion is provided that fixes the handle to the other of the movable body and the holding body.

4. A stopper for an air spring that is provided on a lower member of an air spring and that contacts against an upper member of the air spring to limit a displacement amount of the upper member, the stopper for an air spring comprising:

a movable body that can move vertically to adjust a height of a stopper face of the lower member; and a holding body that holds the movable body in a manner that enables vertical movement thereof, wherein the movable body is configured to be capable of relative rotation around a central axis with respect to the holding body, wherein on at least one of the movable body and the holding body, a plurality of tapers slidable with respect to the other of the movable body and the holding body are formed that inclines in a circumferential direction of the movable body relative to a horizontal surface, and wherein a horizontal surface that positions the movable body in a height direction is provided between respective tapers.

* * * * *